US007328498B2

(12) United States Patent
Eckl et al.

(10) Patent No.: US 7,328,498 B2
(45) Date of Patent: Feb. 12, 2008

(54) METHOD FOR PRODUCING THE SURFACE GEOMETRY OF SOLENOIDS

(75) Inventors: Peter Eckl, Amberg (DE); Ralph-Ronald Göbel, Amberg (DE); Johann Hofrichter, Schmidgaden (DE); Matthias Knab, Freudenberg (DE); Norbert Mitlmeier, Ursensollen (DE); Norbert Zimmermann, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 10/504,577

(22) PCT Filed: Jan. 31, 2003

(86) PCT No.: PCT/DE03/00279

§ 371 (c)(1),
(2), (4) Date: Aug. 13, 2004

(87) PCT Pub. No.: WO03/069641

PCT Pub. Date: Aug. 21, 2003

(65) Prior Publication Data

US 2005/0086796 A1 Apr. 28, 2005

(30) Foreign Application Priority Data

Feb. 15, 2002 (DE) ................................ 102 06 391

(51) Int. Cl.
*H01F 7/06* (2006.01)
*H02K 1/18* (2006.01)

(52) U.S. Cl. ........................ 29/602.1; 29/596; 29/598; 29/606; 29/607; 310/218

(58) Field of Classification Search .............. 29/602.1, 29/596, 598, 606, 607, 609; 310/217, 218, 310/269, 216, 184; 336/234, 178, 212, 324; 335/203, 208, 245, 297
See application file for complete search history.

(56) References Cited

U.S. PATENT DOCUMENTS

| | | | | |
|---|---|---|---|---|
| 2,293,951 | A * | 8/1942 | Seastone et al. | 336/216 |
| 4,700,165 | A | 10/1987 | Brisson et al. | |
| 4,752,707 | A * | 6/1988 | Morrill | 310/184 |
| 4,899,121 | A * | 2/1990 | Boothroyd | 335/245 |
| 5,407,745 | A * | 4/1995 | Bankar et al. | 428/364 |
| 5,703,559 | A * | 12/1997 | Emmerich et al. | 336/234 |

FOREIGN PATENT DOCUMENTS

| | | |
|---|---|---|
| EP | 0 169 748 A1 | 1/1986 |
| JP | 05-062852 | 3/1993 |

* cited by examiner

*Primary Examiner*—A. Dexter Tugbang
*Assistant Examiner*—Tai van Nguyen
(74) *Attorney, Agent, or Firm*—Harness, Dickey & Pierce, P.L.C.

(57) ABSTRACT

A method for producing a solenoid with a center limb and two outer pole shanks that have one pole surface each and one back resting so that it faces away from it. The back is first at least partially freely formed. The solenoid is then elastically tensioned towards the back by a tensioning device. In the tensioned state, the pole surfaces are ground so that the solenoid, when withdrawn from the tensioning device, has a convex support surface constituted by the pole surfaces.

10 Claims, 2 Drawing Sheets

METHOD FOR PRODUCING THE SURFACE GEOMETRY OF SOLENOIDS

This application is the national phase under 35 U.S.C. § 371 of PCT International Application No. PCT/DE03/00279 which has an International filing date of Jan. 31, 2003 which designated the United States of America and which claims priority on German Patent Application number DE 102 06 391.5 filed Feb. 15, 2002, the entire contents of which are hereby incorporated herein by reference.

FIELD OF THE INVENTION

The invention generally relates to a method for producing a part of an electromagnet or solenoid, having a central limb and two outer pole limbs which each have a pole face and a rear side which is remote from the pole face.

BACKGROUND OF THE INVENTION

In production methods to date, the pole faces of the iron parts, i.e. the armature and the yoke, are ground such that they are as flat as possible. In the process, the flatness of the rear-side bearing is imaged on the bearing surface during grinding. Owing to machine and part tolerances, this image is concave or convex. In the case of a concave image, the inner limb sides do not come to bear, i.e. an air gap is formed which weakens the secondary flux in the magnet system. This results in a reduction in the holding force and an increase in the tendency of the magnet systems to hum.

These manufacture-related fluctuations result in considerable additional costs associated with bringing the undesired humming noises to an end by means of relatively complex repair work.

SUMMARY OF THE INVENTION

An embodiment of the invention includes an object of improving a production method such that a defined form for the bearing surface formed by the pole faces is achieved in a simple manner.

An object may be achieved by the following steps:

the rear side is initially at least partially free-formed, the electromagnet is then elastically tensioned toward the rear side by way of a tensioning device, and the pole faces are smoothed by grinding in the tensioned state, with the result that the electromagnet, once it has been removed from the tensioning device, has a bearing surface which is convex in form owing to the pole faces.

One advantageous refinement of the method is provided when the tensioning device is operated magnetically.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
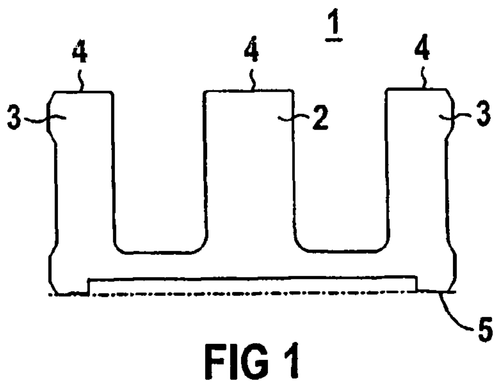
FIGS. 1, 2, 3 show the method steps for producing a first embodiment of a part of an electromagnet.

FIG. 1 shows an iron part 1 of an electromagnet or solenoid, for example an armature or a yoke, which has a central limb 2 and two outer pole limbs 3. These each have a pole face 4. The rear side 5 which is remote from the pole face 4 is free-formed and has a rectangular surface geometry.

Figure 2:
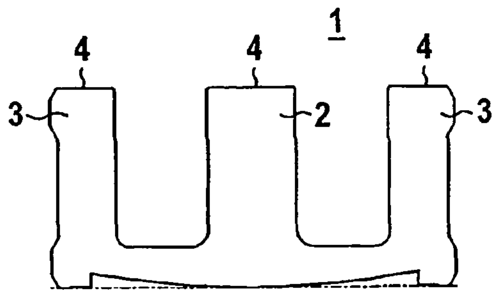

FIG. 2 shows the iron part 1 in the state in which it is elastically tensioned toward the rear side 5 by way of a magnetic tensioning device (not shown here). In this state, the pole faces 4 are ground such that they are straight, as shown in FIG. 2.

Figure 3:
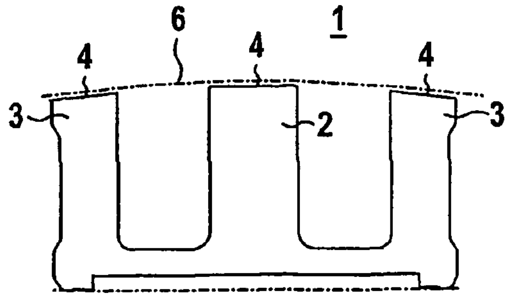

Once it has been removed from the tensioning device, the iron part 1 springs back into its original form as shown in FIG. 3, resulting again in the rectangular surface geometry of the rear side shown in FIG. 1 and, at the same time, in a concave bearing surface 6 (indicated by dashed lines) produced by the pole faces 4.

Figure 7:
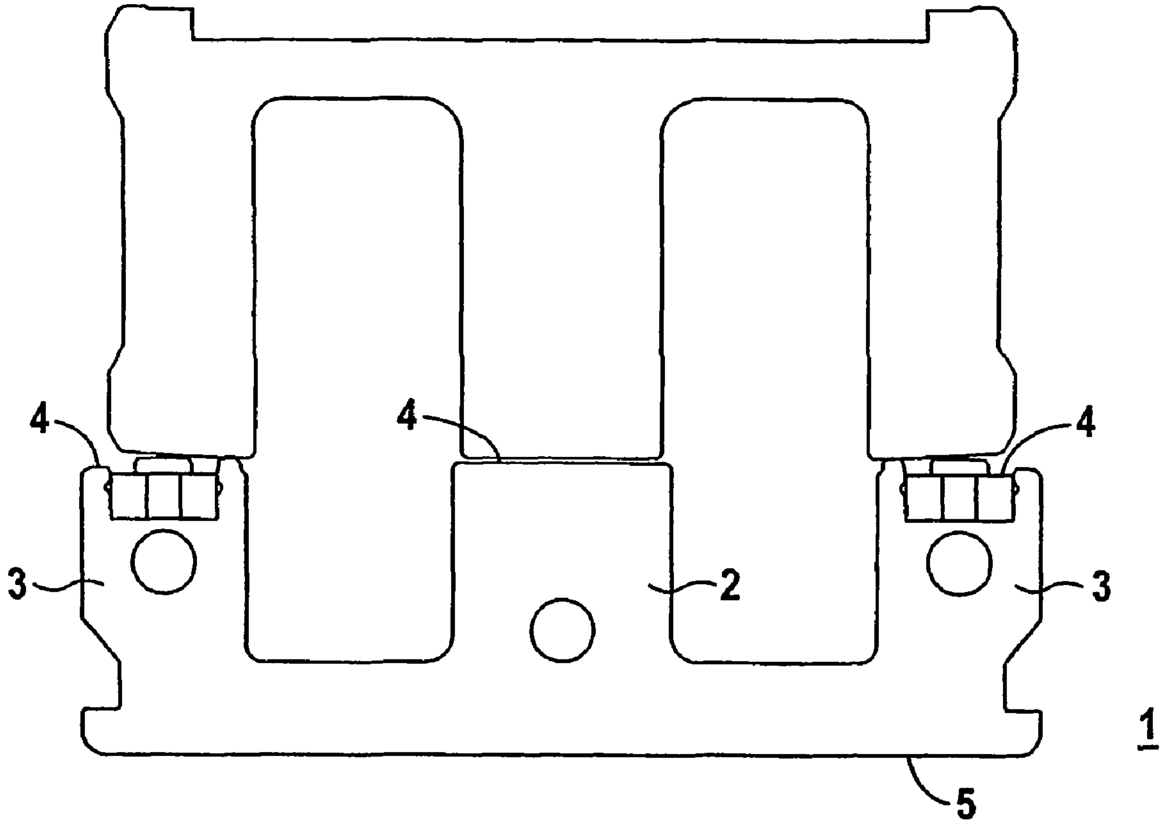
FIG. 7 shows an electromagnet produced according to an embodiment of the invention.

The described production method results, in a desired manner, in the inner limb sides of the outer pole limbs 3 being further forward than the outer limb sides and thus coming to bear when the electromagnet is operated. This production method always results in the bearing surface having a convex surface form which ensures that the inner limb side of the outer pole limbs 3 shown in FIG. 7, which is responsible for the secondary flux and for the holding force in the phase zero crossing of the magnetizing voltage of an electromagnetic switching device, comes to bear. The tendency of the magnet system to hum is thus reduced and the holding force is increased. Furthermore, with this method the production tolerances can be reduced and the form tolerances can be brought into a targeted linear form (DIN ISO 1001).

Figure 4:
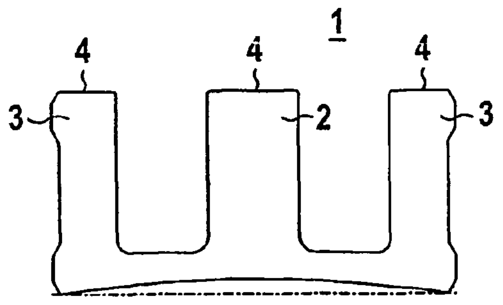
FIGS. 4, 5, 6 show the method steps for producing a second embodiment of a part of an electromagnet.
Figure 5:
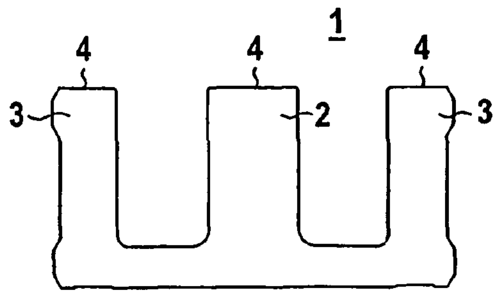
Figure 6:
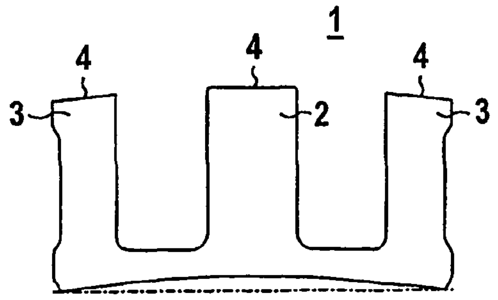

The exemplary embodiment shown in FIGS. 4, 5 and 6 is different from the one described above only in that the rear side 5 in this case has a different surface geometry with a round form. Otherwise, however, the mentioned manufacturing steps likewise result in a convex bearing surface.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for producing a part of an electromagnet including a central limb and two outer pole limbs which each have a pole face and a rear side remote from the pole face, the method comprising:

forming the rear side such that it is initially at least partially free-formed;

elastically tensioning the part toward the rear side using a tensioning device; and grinding the pole faces in the tensioned state to smooth them; wherein once the part has been removed from the tensioning device, the part includes a bearing surface which is convex in form owing to the pole faces.

2. The method as claimed in claim 1, wherein the tensioning device is operated magnetically.

3. The method as claimed in claim 1, wherein the method is for producing at least one of an armature and a yoke of an electromagnet.

4. A method for producing a part of an electromagnet including at least one limb, the at least one limb including a pole face and a rear side remote from the pole face, the method comprising:

elastically tensioning the part toward the rear side, wherein the rear side is initially at least partially free-formed; and smoothing the pole face in the tensioned state, such that a bearing surface of the part is convex in form owing to the pole face.

5. The method of claim 4, wherein the smoothing is done by grinding.

6. The method of claim 4, wherein a tensioning device is used for the elastically tensioning.

7. The method of claim 5, wherein a tensioning device is used for the elastically tensioning.

8. The method as claimed in claim 6, wherein the tensioning device is operated magnetically.

9. The method as claimed in claim 7, wherein the tensioning device is operated magnetically.

10. The method as claimed in claim 4, wherein the method is for producing at least one of an armature and a yoke of an electromagnet.

* * * * *